_United States Patent_ [19]

Wankier

[11] 4,002,770
[45] * Jan. 11, 1977

[54] MAKING BEVERAGE MIXES AND THE PRODUCT THEREOF

[75] Inventor: Bartley Norman Wankier, Ontario, Oreg.

[73] Assignee: General Foods Corporation, White Plains, N.Y.

[ * ] Notice: The portion of the term of this patent subsequent to Sept. 23, 1992, has been disclaimed.

[22] Filed: June 30, 1975

[21] Appl. No.: 591,688

Related U.S. Application Data

[63] Continuation-in-part of Ser. No. 383,352, July 27, 1973, Pat. No. 3,908,024.

[52] U.S. Cl. .................................. 426/72; 426/103; 426/250; 426/289; 426/302; 426/590; 426/658
[51] Int. Cl.² .......................................... A23L 1/27
[58] Field of Search .......... 426/590, 599, 591, 250, 426/540, 289, 293, 302, 311, 72, 74, 96, 98, 103, 658; 127/29, 63

[56] References Cited

UNITED STATES PATENTS

| | | | |
|---|---|---|---|
| 3,397,063 | 8/1968 | Carlson et al. | 426/250 X |
| 3,658,552 | 4/1972 | Carlson et al. | 426/250 |
| 3,715,216 | 2/1973 | Wuhrmann | 426/590 X |
| 3,802,915 | 4/1974 | Gupta | 426/250 X |
| 3,908,024 | 9/1975 | Wankier | 426/72 |

_Primary Examiner_—S. Leon Bashore
_Assistant Examiner_—Kenneth M. Schor
_Attorney, Agent, or Firm_—Daniel J. Donovan; Michael J. Quillinan

[57] ABSTRACT

A dry beverage mix containing a beverage sweetener such as sucrose that may be color plated, is endowed with an improved uniform beverage powder color by separately coating powderous tricalcium phosphate particles with coloring solutes and intimately blending this material with the beverage mix to the extent that portions of the colored TCP are transferred to and adhere to the sweetener.

10 Claims, No Drawings

MAKING BEVERAGE MIXES AND THE PRODUCT THEREOF

RELATED APPLICATIONS

This application is a continuation-in-part of U.S. Ser. No. 383,352 filed July 27, 1973 for MAKING BEVERAGE MIXES AND THE PRODUCT THEREOF and now U.S. Pat. No. 3,908,024.

BACKGROUND OF THE INVENTION

Fruit-flavored dry beverage mixes, packaged in viewable containers enjoy widespread commercial success. Such mixes include natural sweeteners, acidulents and flavors like orange-oil and optionally may have added thereto vitamin and mineral supplements. A particular beverage mix is desirably edified by the inclusion of a coloring agent to further suggest product flavor.

Such mixes should be uniformly blended so that when viewed in a transparent container they provide a color hue that is pleasing and suggestive of the flavor being intended. The sweetener particles, crystalline sucrose, of such beverage mixes have been colored beforehand by coloring solutions plated onto the sucrose. Moisture added by such color plating necessitates presence of tricalcium phosphate particles to promote flowability in mixing and packaging and curtail lumping and caking of the beverage mix as packaged.

When incorporating the aforesaid edifying functional ingredients either for flavor or nutritional fortification, the amount of mixing and blending can be quite extended. Sucrose crystals color-plated with a solution may require in the order of, say, 5 to 10 minutes to achieve the color uniformity intended. During this time the color-plated sucrose particles may undergo fracture by reason of particle-to-particle abrasion such that the white crystalline interior of the particles will be exposed; this detracts from the overall color impression intended by lessening color hue. Moreover, as the hue of a given color darkens, particularly, say, for a flavor like grape, the amount of mixing for uniform blendings is protracted; crystal fracture of color-plated sucrose can decrease hue significantly.

It is an object of the present invention to provide a readily uniformly blended dry beverage mix containing color-plated sweetener particles offering a hue that provides a strong color intensity thereby providing an overall improved organoleptic response and esthetic enhancement of the mix.

In some applications, beverage mix formulations may have therein hygroscopic agents such as fixed oils which may be employed for clouding or other functions and are prone to clumping or eccentricities in flowability. Use of tricalcium phosphate to minimize these variations in blending and packaging is not always completely operative to eliminate the tendency towards lumping or caking of the beverage mix. When attempting to color plate by application of an aqueous solution of coloring solutes, there is an increase in the level of moisture on the sucrose crystals in a given mix; this increase can aggravate the lumping problem. In many food mix applications, therefore, it will be desirable to employ coloring means which limit the amount of water present in the mix ingredients or that may be added to the mix. Yet, to achieve this objective requires the provision of coloring means which have a significant intensity or hue development.

STATEMENT OF THE INVENTION

In accordance with its broadest aspects, tricalcium phosphate in a finely sub-divided form is itself color plated in a frangible easily broken matrix of water-soluble dry coloring solutes, said matrix being formed in an environment that is extraneous to the ultimate coloring operation, i.e. the zone wherein the sweetener particles are to be effectively coated by the solutes. Thereafter, the separately colored TCP matrix particles are blended with the sweetening agents in a typical beverage mix to a free-flowing condition and uniform coloration and caused to undergo transfer together with the TCP onto the sweetener particles. Thus, by intimately blending a separately colored TCP produced by dispersion in a solution or slurry of water soluble solutes which is thereafter dried to a desired reduced moisture content of, say below 0.75%, depending upon the level of such coloring agent that is employed, the foregoing plant flowability and clumping problems are greatly eliminated and the need to rely upon a coloring solution as an adjunct to edify the beverage mix can be substantially reduced or eliminated.

Of considerable significance, is the ability to reduce clumping of beverage mixes containing encapsulated and emulsified tricalcium clouding agents of the type disclosed in U.S. Pat. No. 3,023,106 to Common et al. for POWDERED INSTANT BEVERAGE MIX, i.e. a gum arabic fixation of an encapsulating fat. Such clouding material, even though employed at a very low level in mixes containing tricalcium phosphate but which may be wetted by coloring solutions, will experience clumping, particularly in abnormal humidity plant conditions wherein the sweetener absorbs moisture and the wet crystals thereof adhere to one another through the intermediation of the clouding agent. By dry color plating the TCP as described herein there it is practicable to reduce the incidence of such manufacturing variables as stem from moisture variations in the presence of such clouding agents.

These slurrys or solutions can be treated by spray drying, drum drying or other methods to effectively maintain the TCP particles dispersed sufficiently to be surrounded by the coloring dye solution, whereafter the coated particles are dried to an intended stabilizing moisture level for mixing with the principal beverage mix ingredients. The mix may consist primarily of a quantity of color-plated sucrose crystals having added thereto powderous acidulents such as citric acid, buffering salts and flavorants such as gum-fixed flavors and/or corn syrup solids fixing flavoring oils of natural origin, i.e. citrus oil. If the sucrose is color-plated, it will have a moisture content between 0.2 – 0.4% and the mix will have an overall moisture content less than 0.75%; it will be understood that uncolored sweetening agents may likewise be employed. The colored TCP will be blended at a level of 0.05% to 5.0% by weight of the mix, the upper limit being that of TCP solubility in a given aqueous quantity for beverage reconstitution; a lower TCP limit of 0.05% of the mix is specified simply because the effects are more pronounced at higher levels.

In one embodiment the sugar constituent is at least partly color plated with coloring solutes, it being within the spirit of the invention to either totally color plate a solution on the sucrose or alternatively to coat a portion of the sucrose with a coloring solution and dry plate a coloring dye onto a remaining quantity of the sucrose powder. With continued mixing of the color-plated TCP and the plated or unplated sweetener it has been discovered that the colored TCP particles adhere to the plated or unplated sugar such that the hue thereof is sustained; microscopically the colored TCP particles and some of the coloring solutes will be seen to coat the sugar crystals.

In this connection it has been observed that some moisture should be present on the surface of the sweetener particles in any event, even in the case of an unplated sucrose crystal charge employed as the principal sweetening material; it appears that a limited amount of moisture plating the crystals is operative in blending with remaining ingredients to promote adhesion of the TCP particles and the dry coloring solutes combined therewith, whereby transfer of the TCP and coloring matter in the matrix is better enabled. Generally, the amount of added moisture will vary in this regard depending upon such factors as initial sweetener moisture, atmmospheric humidity and/or moisture added by other materials present in the mix. Typically a very small amount of moisture will be required for this function, say at least 0.0005% added moisture by weight of the sucrose crystals.

By virtue of the present invention, it is now practical to achieve a color intensity comparable to that which would otherwise be practical when color plating sucrose per se without the addition of excessive lump-forming levels of moisture; and, indeed, it is practical to effectively blend the other minor ingredients uniformly throughout the sucrose particles while compensating for any loss of hue that may be experienced by attrition milling or other breakage of the particles as mixing proceeds. In some applications, it will be practical to employ the color plated TCP powder at such a level as not only promotes free-flowing characteristics of the mix ingredients but also reduces the required mixing time that may otherwise be desired in order to effect an intended color or hue in the beverage mix per se.

The particle size of the TCP powder should be such that at least 40% passes a number 200 Mesh USS Screen, the TCP particles as color plated being of substantially the same density, give or take a very minor percent of original TCP powder density, depending upon drying technique employed to fix the color plating agent thereon.

The greatest practical advantage achieved by this color plating technique is the ability to develop a darker hue without addition of extra moisture in a given beverage mix than can be obtained by any other technique using a given amount of color. By coloring the TCP itself, its whitish shade or cast is offset. By virtue of this hue intensification, it is practical to employ mixing techniques to effectively distribute the remaining trace ingredients throughout the beverage powder to an extent which minimizes segregation and provides uniform flavor upon reconstitution of mix portions.

Other aspects of the present invention are the ability to coblend with sucrose, hygroscopic diluent fillers such as powderous polysaccharides like corn syrup solids which serve to bulk the mix but which per se will contribute a critical moisture addition or hygroscopicity which can induce clumping or caking, particularly when a coloring solution plating the sucrose is present in quantities that exceed the ability of TCP per se to function in promoting flow-ability in such a beverage mix.

In other applications corn syrup solids having a high dextrose equivalency, say 24 to 42 D.E., will be employed as a matrix for emulsified flavoring oil droplets; particles of these matrices are quite hygroscopic and thus contribute to caking and poor flowability. By employing a quantity of colored TCP particles in a beverage mix containing the corn syrpu-oil fixations, it becomes practical to better control mix moisture and the tendency of such mixes to lump and cake; the colored TCP matrix components, being transferred upon mixing to the sucrose crystals, thereby serve as a primary coloring for the mix whereby mix moisture is lowered and practically controlled. Hence by color plating the TCP it will be practical to reduce or eliminate the amount of color plating solution applied to the sucrose and thus ameliorate the problems that might otherwise stem from inclusion of such bulking diluents as corn syrup solids or hygroscopic polysaccharidal polymers in the overall beverage mix.

BEST MODE

TCP having a particle size (wet screen method) such that no more than 0.5% is retained on a No. 140 Mesh U.S. Series Screen and no less than 99.0% passes a No. 325 mesh screen is selected.

Fifty pounds of the finely divided TCP in a solution of 17 gallons water, 238 grams of yellow number 5 color and 152 grams of yellow number 6 color are dispersed in a 50 gallon jacketted vessel equipped with a Lightning Mixer. The dispersion is passed through a two-stage Manton-Gaulin homogenizer, the first stage being set at a homogenization pressure of 1000 PSI and the second stage at 1500 PSI. First stage homogenization effectively assures distributing the particles to TCP powder in a finite dispersion throughout the ultimate coloring solution providing that amount of water needed to place the coloring dyes in solution. The coloring solution is then passed through a spray drying nozzle of conventional design having an orifice opening sufficient to pass the TCP particles and effectively dry the coloring solutes onto the particles, the final TCP particles of about 0.15% moisture being at a particle size distribution whereat 55.6% passes a U.S. 200 Standard Mesh. This coloring solution provides an orange color that uniformly distributes itself about the powderous particles of TCP. The colored TCP will have a moisture content less than 0.50% as an upper limit.

Two percent by weight of this product is then blended with a color plated sucrose-based beverage mix essentially in accordance with the procedure set forth in U.S. Pat. No. 3,397,063 to Carlson et al. entitled BEVERAGE MIX AND PROCESS issued Aug. 13, 1968, the teachings and the exemplary best mode of which is incorporated herein by reference. To illustrate, 2000 lbs. of sucrose which has already been wet with the Carlson et al. color plating solution is mixed in a ribbon blender until a uniform color plating of the sucrose is achieved, the plating solution being present at about 0.28%. These "wet" color plated sugar crystals are blended for approximately 2 – 3 minutes and the aforesaid dry colored TCP is then added thereto at the stated level of the total beverage charge and mixing is continued for approximately 5 minutes. At this point the color plated sucrose particles are superficially "dry" and flowable due to the presence of the color plated TCP. The mix is essentially non-caking and free of any clumping tendencies. Miscellaneous acidulents, buffers, flavors and nutrient supplements are then added. Mixing is continued for a period on the order of 10 – 15 additional minutes or until such time as there is a uniform blending of the miscellaneous supplementing ingredients providing a uniform character and appearance and uniformity.

The continued mixing of the colored TCP and the color plated sucrose with the remaining miscellaneous ingredients causes some degree of coloration to be provided to such ingredients as the sucrose. The colored TCP will retain its own coloring but will contribute a hue to the remaining ingredients including those other than sucrose. The overall mix and the individual ingredients thereof may exhibit the particular characterizing color to a greater extent than would be the case if the sucrose were simply wet-plated with coloring solution. It appears that there is a definite migration of the coloring solutes from the TCP by an abrasion and rubbing off of these coloring solutes onto the sucrose. Any sugar crystals that are broken will be recolored by the colorants attaching themselves to the crystals at the broken face thereof whereby a background color which is deeper when viewed microscopically is observed.

Although the invention has been described by reference to a specific and preferred operative embodiment, it will be understood that various miscellaneous ingredients can be included other than those specified; the acids of use may range anywhere from the common powderous food acids such as citric, tartaric, malic, fumaric, adipic, phosphoric and the like to other acidulents such as hydrochloric. In like manner, the flavorants may be gum-fixed or may be fixed in a corn syrup solids matrix or a flavoring oil such as orange oil, lemon oil, etc. all of which miscellaneous edifying ingredients are well within the skill of this art's calling.

In another means for color-plating the TCP particles, finely divided tricalcium phosphate (200 grams) can be dry mixed with 0.014% coloring solutes by weight of TCP. To this dry mix is added 260 ml of water which are mixed to form a paste which is spread on a flat surface and air dried under ambient room temperature conditions.

In still another embodiment for preparing a colored TCP, 13.5 lbs. of the finely divided tricalcium phosphate and 0.282 lbs. of orange color are mixed in a 50 quart Hobart mixer for five minutes while slowly adding water until a smooth slurry is produced. Thereafter the slurry is removed and spread on a flat surface. Using a dispatch oven set at a temperature of 100° F to 150° F the slurry is dried over a period of 72 hours; the dried slurry is ground and screened to produce a fine particular coloring material. This coloring agent is then blended with the foregoing beverage mix essentially set forth in U.S. Pat. No. 3,397,063 to Carlson et al. and essentially in accordance with the modified procedure thereof set forth herein.

What is claimed is:

1. A dry beverage mix containing primarily crystalline sucrose having added thereto powderous acidulents and flavorants, said mix having 0.05–5.0% of the mix of color plated finely divided tricalcium phosphate particles intimately and discretely mixed therewith said color plated phosphate particles having a particle size wherein at least 40% pass through a 200 mesh US screen, said tricalcium phosphate particles having coloring solutes plated thereon by deposition of color solutes in the presence of water onto tricalcium phosphate and drying the plated phosphate to a moisture content of less than 0.5% prior to mixing with said crystalline sucrose particles, portions of the coloring solutes originally plated on the tricalcium phosphate being transferred to and adhereing on the surfaces of the crystalline sucrose particles.

2. The mix of claim 1 wherein the tricalcium phosphate is colored by dispersing the tricalcium phosphate particles in an aqueous coloring solution and drying said solution in the form of discrete particles wherein the tricalcium phosphate is distributed in a matrix of coloring solutes.

3. The package mix of claim 1 wherein the mix has a total moisture content less than 0.75%.

4. The packaged mix of claim 3 wherein the mix contains a quantity of dextrose and a flavoring oil encapsulated therein.

5. The composition of claim 1 wherein the beverage mix contains acidifying and fortifying additives selected from the class consisting of edible food acids, mineral salts, vitamins, gums, fats, and other saccharides and mixtures of these agents in combination.

6. The process of preparing an acidified beverage mix contains primarily crystalline sucrose said mix intended to be viewed and having an enhanced coloration which comprises forming a dispersion of finely divided tricalcium phosphate in an aqueous solution of coloring solutes, drying the dispersion to a moisture content less than 0.5%, said dried dispersion being in the form of a frangible, easily broken matrix of coloring solutes having the tricalcium phosphate discretely distributed throughout, and then mixing from 0.05–5.0% by weight of the mix of the dried colored phosphate dispersion with sucrose particles to a free-flowing form of uniform coloration and causing the coloring solutes originally plated on the tricalcium phosphate to be transferred to and adhere on the surfaces of the sucrose particles by continued intermixing of the ingredients.

7. The process of claim 6 wherein the tricalcium phosphate particles are colored by drying droplets of said dispersion to a moisture content after drying of less than 0.50%.

8. The process of claim 6 wherein the tricalcium phosphate has a particle size such that 40% passes a No. 200 U.S. screen.

9. The process of claim 6 wherein the finely divided tricalcium phosphate has a particle size such that no more than 0.5% is retained on a 140 mesh US screen.

10. The process of claim 6 wherein the finely divided tricalcium phosphate has a particle size such that no less than 99% passes a No. 325 mesh US screen.

* * * * *